(12) United States Patent
Guan et al.

(10) Patent No.: US 11,940,425 B2
(45) Date of Patent: Mar. 26, 2024

(54) MODULATION METHOD USING A COMPREHENSIVE TWO-DIMENSIONAL GAS CHROMATOGRAPH

(71) Applicant: Nanjing Nine Max Instrument Co. Ltd., Nanjing (CN)

(72) Inventors: Xiaosheng Guan, Beijing (CN); Zhijun Zhao, Shanghai (CN); Hai Jiang, Shanghai (CN)

(73) Assignee: Nanjing Nine Max Instrument Co. Ltd., Nanjing (CN)

( * ) Notice: Subject to any disclaimer, the term of this patent is extended or adjusted under 35 U.S.C. 154(b) by 360 days.

(21) Appl. No.: 17/422,604

(22) PCT Filed: Jul. 19, 2019

(86) PCT No.: PCT/CN2019/096622
§ 371 (c)(1),
(2) Date: Jul. 13, 2021

(87) PCT Pub. No.: WO2020/155577
PCT Pub. Date: Aug. 6, 2020

(65) Prior Publication Data
US 2022/0091075 A1     Mar. 24, 2022

(30) Foreign Application Priority Data
Feb. 3, 2019   (CN) .......................... 201910108468.5

(51) Int. Cl.
*G01N 30/60*     (2006.01)
*G01N 30/16*     (2006.01)
(Continued)

(52) U.S. Cl.
CPC ............. *G01N 30/60* (2013.01); *G01N 30/16* (2013.01); *G01N 30/30* (2013.01); *G01N 30/32* (2013.01);
(Continued)

(58) Field of Classification Search
CPC ............... G01N 30/465; G01N 30/463; G01N 2030/3084; G01N 2030/3061; G01N 2030/025; G01N 30/468
See application file for complete search history.

(56) References Cited

U.S. PATENT DOCUMENTS 3,881,892 A * 5/1975 Gehrke .................. G01N 30/08
96/104
5,196,039 A * 3/1993 Phillips ................ G01N 30/463
95/82
(Continued)

FOREIGN PATENT DOCUMENTS

CN          1786705 A     6/2006
CN          103675166 A   3/2014
(Continued)

OTHER PUBLICATIONS

International Search Report and Written Opinion, PCT/CN2019/096622/, Date of completion of the International search Oct. 24, 2019.
(Continued)

*Primary Examiner* — Tran M. Tran
(74) *Attorney, Agent, or Firm* — Flener IP & Business Law; Zareefa B. Flener

(57) ABSTRACT

A comprehensive two-dimensional gas chromatograph, comprising a sample injector, a primary dimension column, a two-position three-way valve, a secondary dimension column, a three-way tube, a heating oven and a detector, wherein an inlet end(s) of the sample injector is connected to a carrier gas line and as well to a sample line, and an outlet end thereof is connected to a first end of the primary dimension column, a second end of the primary dimension column is connected to a first branch of the three-way tube, a second branch of the T-union is connected to a first end of the secondary dimension column, a second end of the
(Continued)

secondary dimension column is connected to an inlet of the detector, a third branch of the three-way tube is connected to a gas inlet of the two-position three-way valve, and a first gas outlet of the two-position three-way valve is connected to the carrier gas line.

5 Claims, 4 Drawing Sheets

(51) Int. Cl.
    *G01N 30/30*      (2006.01)
    *G01N 30/32*      (2006.01)
    *G01N 30/02*      (2006.01)

(52) U.S. Cl.
    CPC ............ *G01N 2030/025* (2013.01); *G01N 2030/3084* (2013.01); *G01N 2030/328* (2013.01)

(56) References Cited

U.S. PATENT DOCUMENTS

| | | | | |
|---|---|---|---|---|
| 5,830,353 A * | 11/1998 | Henderson | ............ | G01N 30/30 95/87 |
| 6,632,268 B2 * | 10/2003 | Seeley | ................ | G01N 30/463 73/23.39 |
| 7,091,044 B2 * | 8/2006 | Cai | ...................... | G01N 30/463 422/89 |
| 7,247,189 B2 * | 7/2007 | Seeley | .................. | G01N 30/20 95/82 |
| 7,306,656 B2 * | 12/2007 | Lange | .................... | G01N 30/12 95/87 |
| 7,507,586 B2 * | 3/2009 | Cai | ...................... | G01N 30/463 73/23.42 |
| 7,518,103 B2 * | 4/2009 | Amirav | ................ | G01N 30/463 250/281 |
| 7,601,543 B2 * | 10/2009 | Cai | ...................... | G01N 30/465 422/89 |
| 7,779,670 B2 * | 8/2010 | Wang | .................... | G01N 30/465 73/23.42 |
| 8,119,983 B2 * | 2/2012 | Ochiai | ................ | G01N 30/468 250/281 |
| 8,322,189 B2 * | 12/2012 | Wang | .................... | G01N 30/463 73/23.39 |
| 8,613,215 B2 * | 12/2013 | Lambertus | .......... | G01N 30/463 73/23.42 |
| 9,027,391 B2 * | 5/2015 | Radtke | ................ | G01N 30/463 73/61.56 |
| 9,067,167 B2 * | 6/2015 | Mondello | .............. | G01N 30/32 |
| 9,341,604 B2 * | 5/2016 | Fan | ........................ | G01N 30/46 |
| 9,423,383 B2 * | 8/2016 | Tipler | ................ | G01N 30/6095 |
| 9,599,595 B2 * | 3/2017 | Gellert | .............. | G01N 30/6034 |
| 9,751,040 B2 * | 9/2017 | Tipler | .................... | G01N 30/72 |
| 10,254,258 B2 * | 4/2019 | Yamaguchi | ............ | G01N 30/88 |
| 10,639,580 B2 * | 5/2020 | Okada | ................ | G01N 30/6052 |
| 10,753,913 B2 * | 8/2020 | Tipler | ........................ | C25B 9/73 |
| 10,768,150 B2 * | 9/2020 | Fan | ........................ | G01N 30/465 |
| 10,794,875 B2 * | 10/2020 | Masuda | ............ | G01N 30/7206 |
| 11,009,489 B2 * | 5/2021 | Dryden | .............. | G01N 30/8658 |
| 11,099,160 B2 * | 8/2021 | Shibamoto | ........... | G01N 30/465 |
| 11,110,385 B2 * | 9/2021 | Tipler | .................... | G01N 30/62 |
| 11,391,706 B2 * | 7/2022 | Merrick | .................. | G01N 30/54 |
| 11,846,614 B2 * | 12/2023 | Stallone | ................ | G01N 30/30 |
| 2002/0148353 A1 | 10/2002 | Seeley | | |
| 2004/0232366 A1 | 11/2004 | Seeley | | |
| 2005/0106743 A1 * | 5/2005 | Zilioli | .................. | G01N 30/463 436/161 |
| 2006/0115904 A1 | 6/2006 | Cai | | |
| 2008/0302959 A1 | 12/2008 | Amirav | | |
| 2010/0154511 A1 | 6/2010 | Lambertus et al. | | |
| 2011/0888452 | 4/2011 | Kim et al. | | |
| 2011/0143952 A1 * | 6/2011 | Lewis | ................ | G01N 30/6095 96/104 |
| 2011/0203346 A1 * | 8/2011 | Mommers | .......... | G01N 30/8668 73/1.06 |
| 2014/0060151 A1 | 3/2014 | Gellert | | |
| 2017/0248558 A1 * | 8/2017 | Roques | .................. | G01N 30/30 |
| 2018/0259493 A1 * | 9/2018 | Guan | .................... | G01N 30/465 |
| 2022/0082535 A1 * | 3/2022 | Borton | .................... | G01N 30/16 |

FOREIGN PATENT DOCUMENTS

| | | |
|---|---|---|
| CN | 107643350 A | 1/2018 |
| CN | 107764920 A | 3/2018 |
| CN | 109580852 A | 4/2019 |
| WO | 03079001 A1 | 9/2003 |

OTHER PUBLICATIONS

Modulation techniques and applications in comprehensive two-dimensional gas chromatography (GCxGC), Matthias Pursch et al., Anal Bioanal Chem (2002) 373: 356-367; Published online: Jul. 4, 2002, Springer-Verlag 2002.

First Office Action, The State Intellectual Property Office of People's Republic of China, Application No. 201910108468.5, dated Apr. 6, 2021.

Analysis of Biodiesel/Petroleum Diesel Blends with Comprehensive Two-Dimensional Gas Chromatography, John V. Seeley et al, Journal of Chromatographic Science, vol. 45, Nov./Dec. 2007.

* cited by examiner

MODULATION METHOD USING A COMPREHENSIVE TWO-DIMENSIONAL GAS CHROMATOGRAPH

TECHNICAL FIELD

The present invention relates to the technical field of analytical instruments, in particular to a comprehensive two-dimensional gas chromatograph and a modulation method.

BACKGROUND ART

Stop-flow type gas flow modulation is a method for implementing comprehensive two-dimensional gas chromatography by periodically interrupting primary dimension flow for a short period of time. There are currently two ways of implementing stop-flow type gas flow modulation: one is to use a rotary valve or a diaphragm valve to switch between different outflow ports for a sample stream flowing through the valve, and thus to stop primary dimension flow upon closing some ports or forming a closed loop, which has disadvantages that the sample needs to flow through the valve body, the valve needs to be well inert and operable at high temperatures, and flow modulations of primary dimension and secondary dimension need independent carrier gas controls to accomplish comprehensive two-dimensional gas chromatographic separation; and the other is to use an on-off valve to periodically build up a carrier gas pressure, equal to that at the head of the primary dimension column, at the junction of the secondary dimension column and the primary dimension column for a short period of time so as to interrupt the primary dimension flow, which has disadvantages that the primary dimension overall flow as well as speed of sample re-injection onto the secondary dimension is considerably influenced by the flow resistance of the secondary dimension column, and peak shape of the sample re-injection onto secondary dimension is also imperfect.

For this reason, the present invention provides a comprehensive two-dimensional gas chromatograph having the following beneficial effects: (1) special valves that are high temperature operable and inert are not required; (2) no independent primary dimension and secondary dimension carrier gas flow controls are required; (3) the analysis speed is accelerated; and (4) the peak shape is improved.

SUMMARY OF THE INVENTION

The object of the present invention is achieved by the following technical solutions: A comprehensive two-dimensional gas chromatograph, comprising a sample injector, a primary dimension column, a two-position three-way valve, a secondary dimension column, a three-way tube, a heating oven and a detector, wherein an inlet end(s) of the sample injector is connected to a carrier gas line and as well to a sample line, and an outlet end thereof is connected to a first end of the primary dimension column, a second end of the primary dimension column is connected to a first branch of the three-way tube, a second branch of the T-union is connected to a first end of the secondary dimension column, a second end of the secondary dimension column is connected to an inlet of the detector, a third branch of the three-way tube is connected to a gas inlet of the two-position three-way valve, and a first gas outlet of the two-position three-way valve is connected to the carrier gas line.

According to the comprehensive two-dimensional gas chromatograph, a second gas outlet of the two-position three-way valve is connected to a gas-venting capillary.

According to the comprehensive two-dimensional gas chromatograph, the bodies of the primary dimension column and the secondary dimension column as well as part of the three-way tube are arranged inside the heating oven, and the two-position three-way valve is arranged outside the heating oven.

According to the comprehensive two-dimensional gas chromatograph, in a first operational phase, the gas inlet of the two-position three-way valve is in communication for a first predetermined time WI with the second gas outlet other than the first gas outlet; and in a second operational phase following termination of the first operational phase, the gas inlet of the two-position three-way valve is in communication for a second predetermined time $t_{flush}$ with the first gas outlet other than the second gas outlet.

According to the comprehensive two-dimensional gas chromatograph, in the first predetermined time $t_{fill}$, the sample after primary dimension separation flows with the carrier gas into a portion of the third branch of the three-way tube that is located inside the heating oven without flowing into any portion that is located outside the heating oven.

According to the comprehensive two-dimensional gas chromatograph, in the second predetermined time $t_{flush}$, the carrier gas comes in from the first gas outlet and carries the sample present in the third branch of the three-way tube into the secondary dimension column for orthogonal separation and then into the detector for detection.

According to the comprehensive two-dimensional gas chromatograph, the first operational phase is restarted when the second predetermined time is over.

A modulation method using a comprehensive two-dimensional gas chromatograph, comprising the following steps:

Step 1. Flow path connections: connecting an inlet end of a sample injector to a carrier gas line and an outlet end thereof to a first end of a primary dimension column; connecting a second end of the primary dimension column to a first branch of a three-way tube; connecting a second branch of the T-union to a first end of a secondary dimension column; connecting a second end of the secondary dimension column to an inlet of a detector; connecting a third branch of the three-way tube to a gas inlet of a two-position three-way valve; and connecting a first gas outlet of the two-position three-way valve to the carrier gas line, wherein the bodies of the primary dimension column and the secondary dimension column as well as part of the three-way tube are arranged inside a heating oven, and the two-position three-way valve is arranged outside the heating oven;

Step 2. Controlling the valve core of the two-position three-way valve such that the gas inlet of the two-position three-way valve is in communication with a second gas outlet other than the first gas outlet for a first predetermined time $t_{fill}$ during which the sample after primary dimension separation flows into the third branch of the three-way tube with the carrier gas;

Step 3. After the end of Step 2, controlling the valve core of the two-position three-way valve such that the gas inlet of the two-position three-way valve is in communication with the first gas outlet other than the second gas outlet for a second predetermined time $t_{flush}$ during which the carrier gas comes in from the first gas outlet and carries the sample present in the third branch of the three-way tube into the secondary dimension column for orthogonal separation.

According to the modulation method, the first predetermined time $t_{fill}$ is set such that the sample after primary dimension separation flows with the carrier gas only into a portion of the third branch of the three-way tube that is located inside the heating oven without flowing into any portion of the third branch of the three-way tube that is located outside the heating oven.

According to the modulation method, wherein during the $t_{flush}$, only the sample present in the third branch of the three-way tube flows into the secondary dimension column for orthogonal separation and then into the detector for detection.

According to the modulation method, Step 2 is restarted after the end of Step 3.

According to the modulation method, Step 1 further comprises connecting the second gas outlet of the two-position three-way valve to a gas-venting capillary.

According to the modulation method, during the $t_{flush}$: (1) the end-to-end pressure between the first end and the second end of the primary dimension column is temporarily balanced and thus the flow of sample in the primary dimension column is stopped without further sample separation; or (2) the pressure at the first end of the primary dimension column is slightly higher than that at the second end and thus results in a slow sample separation in the primary dimension column. According to the modulation method, the comprehensive two-dimensional gas chromatograph is such as defined hereinbefore.

DETAILED DESCRIPTION OF THE INVENTION

The comprehensive two-dimensional gas chromatograph according to the present invention will be described in detail below with reference to the accompanying drawings.

Figure 1:
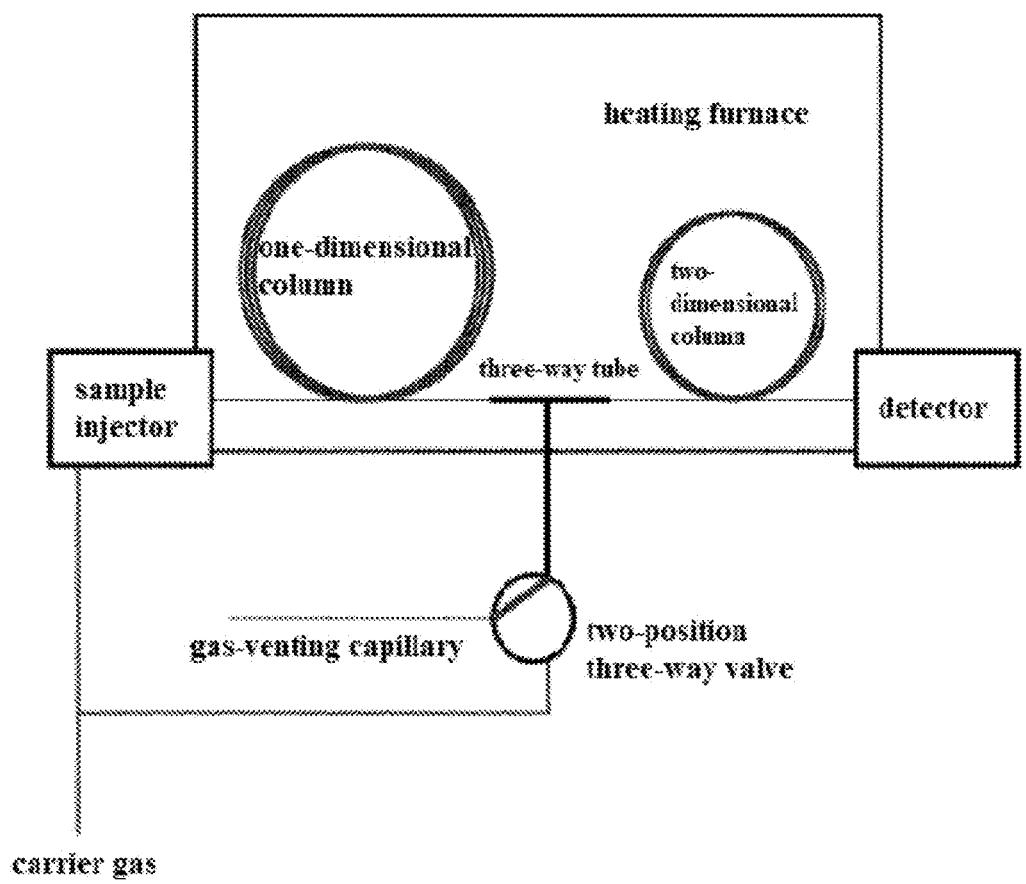
FIG. 1 is a schematic view showing the structure of the comprehensive two-dimensional gas chromatograph according to the present invention.

As shown in FIG. 1, a comprehensive two-dimensional gas chromatograph comprises a sample injector, a primary dimension column, a two-position three-way valve, a secondary dimension column, a three-way tube, a heating oven and a detector, wherein an inlet end(s) of the sample injector is connected to a carrier gas line and as well to a sample line (not shown), an outlet end thereof is connected to a first end of the primary dimension column, a second end of the primary dimension column is connected to a first branch of the three-way tube, a second branch of the T-union is connected to a first end of the secondary dimension column, and a second end of the secondary dimension column is connected to an inlet of the detector; a third branch of the three-way tube is connected to a gas inlet of the two-position three-way valve, a first gas outlet of the two-position three-way valve is connected to the carrier gas line, and a second gas outlet of the two-position three-way valve is connected to a gas-venting capillary.

The bodies of the primary dimension column and the secondary dimension column as well as part of the three-way tube are arranged inside the heating oven, and the two-position three-way valve is arranged outside the heating oven.

Figure 2:
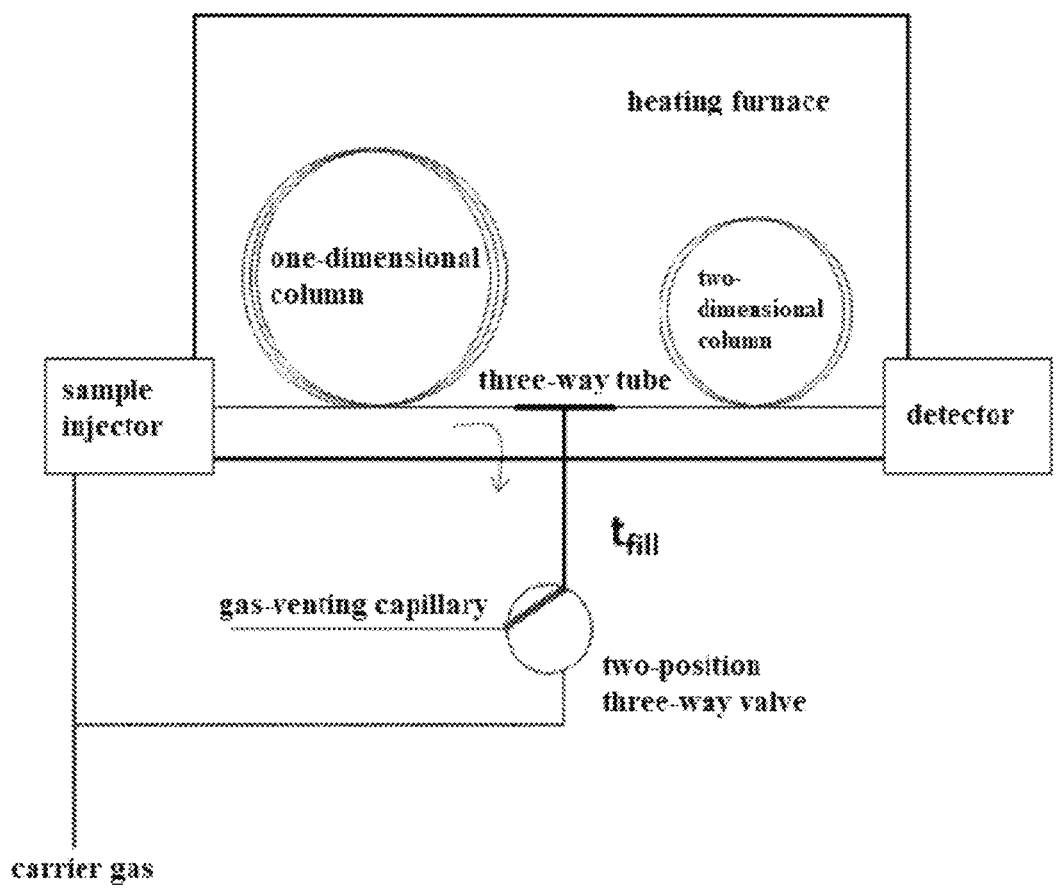
FIG. 2 is a schematic view illustrating a first operational phase of the comprehensive two-dimensional gas chromatograph according to the present invention.
Figure 3:
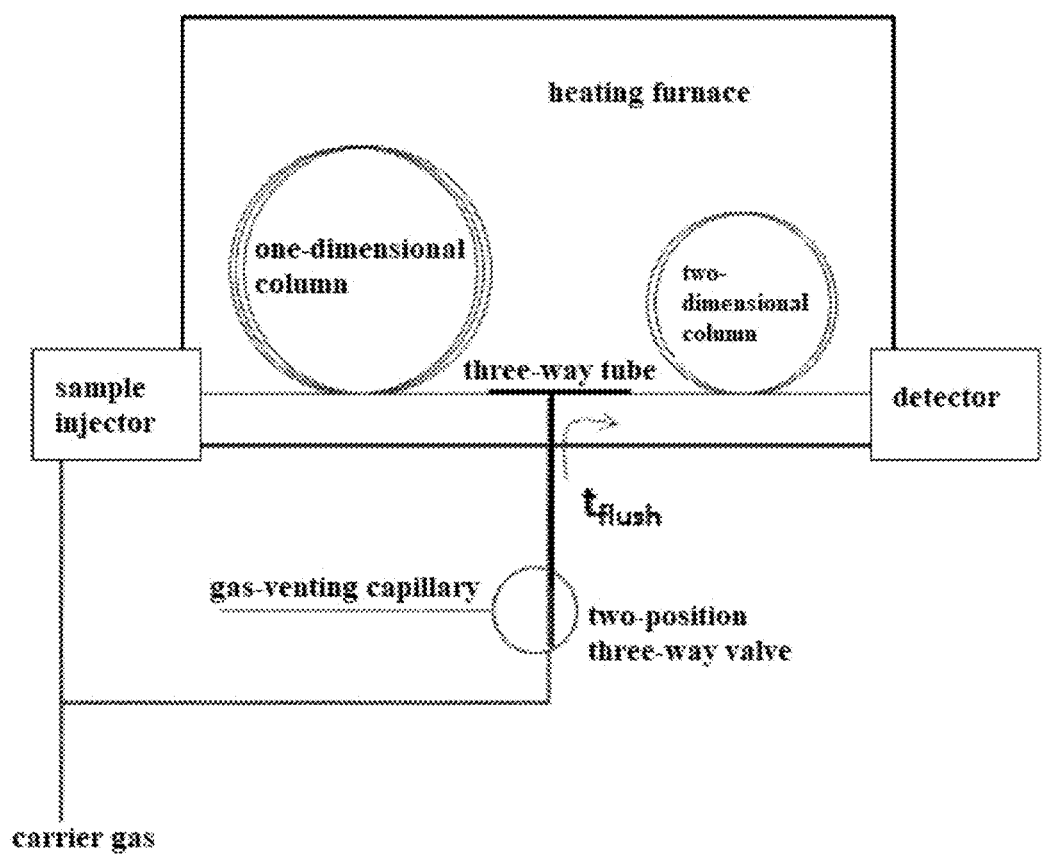
FIG. 3 is a schematic view illustrating a second operational phase of the comprehensive two-dimensional gas chromatograph according to the present invention.

The operating principle of the comprehensive two-dimensional gas chromatograph of the present invention will be described below with reference to FIGS. 2 and 3. As shown in FIG. 2, in the first operational phase, the gas inlet of the two-position three-way valve is in communication with the second gas outlet other than the first gas outlet for a first predetermined time $t_{fill}$ during which the sample after primary dimension separation flows with the carrier gas into the third branch of the three-way tube; the first predetermined time $t_{fill}$ is set such that the sample after primary dimension separation flows with the carrier gas only into a portion of the third branch of the three-way tube that is located in the heating oven without flowing into any portion that is located outside the heating oven, and the inner diameter and length of the portion of the third branch of the three-way tube located inside the heating oven are set such that the inner volume is sufficient to contain the sample after primary dimension separation without allowing it to flow into the portion located outside the heating oven. After the end of the first operational phase, the second operational phase follows, and as shown in FIG. 3, the gas inlet of the two-position three-way valve is in communication with the first gas outlet other than the second gas outlet, and the carrier gas comes in from the first gas outlet and carries the sample present in the third branch of the three-way tube into the secondary dimension column for orthogonal separation for a second predetermined time $t_{flush}$. During the above-mentioned second operational phase ($t_{flush}$ period): (1) the end-to-end pressure between the first end and the second end of the primary dimension column is temporarily balanced such that the flow of sample in the primary dimension column is stopped without further sample separation; (2) or the pressure at the first end of the primary dimension column is slightly higher than that at the second end and thus results in a slow sample separation in the primary dimension column, during which only the sample present in the third branch of the three-way tube flows into the secondary dimension column for orthogonal separation and then into the detector for detection. The first operational phase can be restarted when the second predetermined time is over. During the first operational phase, a high-pressure carrier gas equal to that in the primary dimension column still remains momentarily in the secondary dimension column and will thus prevent the carrier gas of the primary dimension column from carrying the sample into the secondary dimension column while making its way to the three-way tube.

In the present invention, the two-position three-way valve is repeatedly switched in accordance with a modulation cycle: $t=t_{fill}+t_{flush}$, thus providing continuous modulation and comprehensive two-dimensional gas chromatographic separation on the primary dimension flow.

Figure 4:
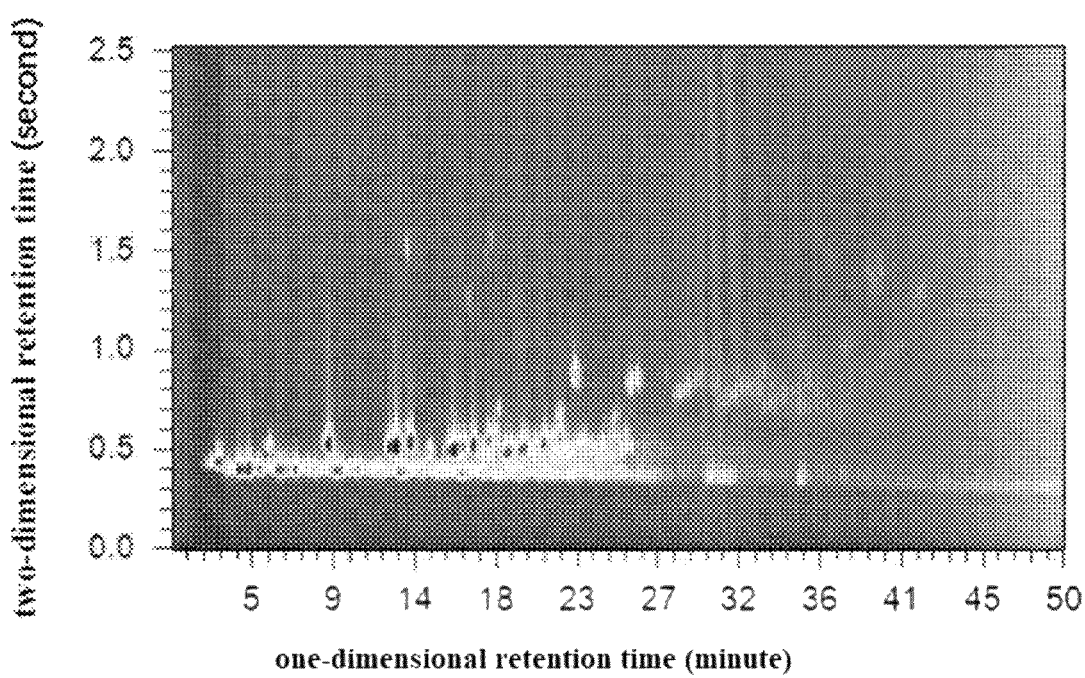
FIG. 4 is a diagram showing the result of a comprehensive two-dimensional gas chromatographic separation of a gasoline sample using the comprehensive two-dimensional gas chromatograph according to the present invention.

FIG. 4 is a diagram showing a result of a comprehensive two-dimensional gas chromatographic separation on a gasoline sample using the comprehensive two-dimensional gas chromatograph of the present invention, which demonstrates the effect of the optimized device of the present invention. It can be seen from FIG. 4 that under the modulation with the comprehensive two-dimensional gas chromatograph of the present invention, the gasoline is separated in primary dimension under boiling points and separated in second dimension under polarities at one go, which results in an effective comprehensive secondary dimension separation.

In the above-mentioned embodiment, the second gas outlet of the two-position three-way valve is connected to a gas-venting capillary, which functions to increase the resistance, reduce the venting flow rate, and prevent sample loss from flowing out of the valve more effectively in time $t_{fill}$. The gas-venting capillary may also be in other forms of damping elements, such as a porous gas blocker, a needle valve, and the like, all of which are however optional, i.e., the object of the present invention may also be achieved by leaving the second gas outlet of the two-position three-way valve open-ended without a gas-venting capillary being connected thereto.

Base on the comprehensive two-dimensional gas chromatograph as described above, the present invention also provides a modulation method using the same:

Step 1. Flow path connections: connecting an inlet end of a sample injector to a carrier gas line and an outlet end thereof to a first end of a primary dimension column; connecting a second end of the primary dimension column to a first branch of a three-way tube; connecting a second branch of the T-union to a first end of a secondary dimension column; connecting a second end of the secondary dimension column to an inlet of a detector; connecting a third branch of the three-way tube to a gas inlet of a two-position three-way valve; connecting a first gas outlet of the two-position three-way valve to the carrier gas line; and connecting the second gas outlet of the two-position three-way valve to a gas-venting capillary, wherein the bodies of the primary dimension column and the secondary dimension column as well as part of the three-way tube are arranged inside a heating oven, and the two-position three-way valve is arranged outside the heating oven;

Step 2. Controlling the valve core of the two-position three-way valve such that the gas inlet of the two-position three-way valve is in communication with a second gas outlet other than the first gas outlet for a first predetermined time $t_{fill}$ during which the sample after primary dimension separation flows into the third branch of the three-way tube with the carrier gas, wherein the first predetermined time $t_{fill}$ is set such that the sample after primary dimension separation flows with the carrier gas only into a portion of the third branch of the three-way tube that is located inside the heating oven without flowing into any portion of the third branch of the three-way tube that is located outside the heating oven.

Step 3. After the end of Step 2, controlling the valve core of the two-position three-way valve such that the gas inlet of the two-position three-way valve is in communication with the first gas outlet other than the second gas outlet for a second predetermined time $t_{flush}$ during which the carrier gas comes in from the first gas outlet and carries the sample present in the third branch of the three-way tube into the secondary dimension column for orthogonal separation, wherein during the $t_{flush}$, only the sample present in the third branch of the three-way tube flows into the secondary dimension column for orthogonal separation and then into the detector for detection, and also during the $t_{flush}$: the end-to-end pressure between the first end and the second end of the primary dimension column is temporarily balanced and thus the flow of sample in the primary dimension column is stopped without further sample separation; or the pressure at the first end of the primary dimension column is slightly higher than that at the second end and thus results in a slow sample separation in the primary dimension column.

Step 4. Restarting Step 2 after the end of Step 3.

What is claimed is:

1. A modulation method using a comprehensive two-dimensional gas chromatograph which comprises a sample injector, a primary dimension column, a two-position three-way valve, a secondary dimension column, a three-way tube, a heating oven and a detector, comprising the following steps:

flow path connections: connecting an inlet end of the sample injector to a carrier gas line as well to a sample introduction means and an outlet end of the sample injector to a first end of the primary dimension column; connecting a second end of the primary dimension column to a first branch of the three-way tube; connecting a second branch of the three way tube to a first end of the secondary dimension column; connecting a second end of the secondary dimension column to the detector; connecting a third branch of the three-way tube to a gas inlet of the two-position three-way valve; connecting a first gas outlet of the two-position three-way valve to the carrier gas line; and connecting a second gas outlet of the two-position three-way valve to a gas-venting capillary, wherein the entireties of the primary dimension column and the secondary dimension column as well as part of the three-way tube are arranged inside the heating oven, and the two-position three-way valve is arranged outside the heating oven;

a first step of controlling the two-position three-way valve such that the gas inlet of the two-position three-way valve is in communication with the second gas outlet other than the first gas outlet for a first predetermined time trio during which the sample after primary dimension separation flows into the third branch of the three-way tube with the carrier gas;

a second step of controlling the two-position three-way valve such that the gas inlet of the two-position three-way valve is in communication with the first gas outlet other than the second gas outlet for a second predetermined time $t_{flush}$ during which the carrier gas comes in from the first gas outlet and carries the sample present in the third branch of the three-way tube into the secondary dimension column for orthogonal separation.

2. The modulation method according to claim 1, wherein the first predetermined time $t_{fill}$ is set such that the sample after primary dimension separation flows with the carrier gas only into a portion of the third branch of the three-way tube that is located inside the heating oven without flowing into any portion of the third branch of the three-way tube that is located outside the heating oven.

3. The modulation method according to claim 1, wherein during the $t_{flush}$, only the sample present in the third branch of the three-way tube flows into the secondary dimension column for orthogonal separation and then into the detector for detection.

4. The modulation method according to claim 1, wherein the first step of controlling is restarted after the second step of controlling.

5. The modulation method according to claim 1, wherein during the $t_{flush}$: (1) the pressure established between the first end and the second end of the primary dimension column is temporarily balanced and thus the gas flow in the primary dimension column is stopped without further sample separation; or (2) the pressure at the first end of the primary dimension column is slightly higher than that at the second end and thus results in a slow sample separation in the primary dimension column.

* * * * *